(12) United States Patent
Kashiwagi

(10) Patent No.: US 11,787,726 B2
(45) Date of Patent: Oct. 17, 2023

(54) SINTERING METHOD OF POROUS GLASS BASE MATERIAL FOR OPTICAL FIBER

(71) Applicant: Shin-Etsu Chemical Co., Ltd., Tokyo (JP)

(72) Inventor: Yusuke Kashiwagi, Ibaraki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 65 days.

(21) Appl. No.: 17/581,276

(22) Filed: Jan. 21, 2022

(65) Prior Publication Data

US 2022/0234935 A1 Jul. 28, 2022

(30) Foreign Application Priority Data

Jan. 28, 2021 (JP) ................................. 2021-012396

(51) Int. Cl.
 *C03B 37/018* (2006.01)
 *C03B 37/014* (2006.01)

(52) U.S. Cl.
 CPC .... *C03B 37/01853* (2013.01); *C03B 37/0146* (2013.01)

(58) Field of Classification Search
 CPC .................. C03B 37/0146; C03B 37/0185
 See application file for complete search history.

(56) References Cited

U.S. PATENT DOCUMENTS

| 2010/0294002 A1 | 11/2010 | Ito et al. |
| 2016/0130173 A1 | 5/2016 | Uchida |
| 2016/0318792 A1* | 11/2016 | Suganuma .......... C03B 37/0146 |

FOREIGN PATENT DOCUMENTS

| JP | 2004292195 A | * 10/2004 | ......... C03B 37/0146 |
| JP | 2010-189251 | 9/2010 | |
| JP | 2016-88821 | 5/2016 | |

OTHER PUBLICATIONS

Translation of JP 2004292195 (Year: 2004).*

* cited by examiner

*Primary Examiner* — Cynthia Szewczyk
(74) *Attorney, Agent, or Firm* — Greenblum & Bernstein, P.L.C.

(57) ABSTRACT

A sintering apparatus comprising: a furnace core tube containing a porous glass base material for optical fiber whose longitudinal direction is along the axial direction; and a multi-stage heater in which two or more heaters surround the furnace core tube and are arranged in the axial direction of the furnace core tube to form a heating area in the furnace core tube, is used. The sintering method includes a step in which the base material is heated in the heating area to perform a first dehydration process; and a step in which the base material is moved so that the position in the longitudinal direction of the base material where the dehydration was identified as the most insufficient, is at the position in the axial direction of the furnace core tube where the temperature is highest in the heating area, and then a second dehydration process is performed.

4 Claims, 3 Drawing Sheets

SINTERING METHOD OF POROUS GLASS BASE MATERIAL FOR OPTICAL FIBER

CROSS-REFERENCE TO RELATED APPLICATION

This non-provisional application claims priority under 35 U.S.C. § 119(a) from. Japanese Patent Application No. 2021-012396, filed on Jan. 28, 2021, the entire contents of which are incorporated herein by reference.

BACKGROUND

Technical Field

The present invention relates to a sintering method of a porous glass base material for optical fiber produced by dehydrating and sintering the glass base material.

Background Art

The porous glass base material, which is formed by depositing glass particles on a target rod such as a glass rod, is made into transparent glass by dehydration and sintering, and is used as the glass base material for optical fiber. The VAD method and the OVD method are used to produce porous glass base material for optical fiber. In these methods, glass raw materials are first burned in a flame to hydrolyze and produce fine glass particles, which are then adhered in the axial or radial direction of the rotating target rod to produce the porous glass base material for optical fiber.

The dehydration and sintering of porous glass base material for optical fiber are performed using a dehydration and sintering apparatus equipped with a furnace core tube that contains porous glass base material for optical fiber gripped by a support rod and a heater arranged around the periphery of the furnace core tube. A gas supply port is provided at the bottom of the furnace core tube, through which gases necessary for dehydrating and sintering the porous glass base material for optical fibers, such as halogen gases and inert gases, are supplied. On the other hand, a gas exhaust pipe is provided at the top of the furnace core tube to discharge the gas in the furnace core tube. Then, the porous glass base material for optical fiber gripped by the support rod descends while rotating in the furnace core tube. The porous glass base material for optical fiber is dehydrated and sintered as it passes through the heating area by the heater.

As a method of dehydration and sintering, JP 2010-189251A describes a two-stage vitrification method in which the porous glass base material is dehydrated by passing through a heating area set at a temperature of 900-1300° C. The dehydrated porous glass base material is then pulled up once to a predetermined position in the furnace core tube, the temperature of the heating area is changed to 1400-1600° C., and then the glass base material is sintered by passing through the heating area again. However, the method in JP 2010-189251A has a problem in that it takes a long time to process and has low production efficiency. In order to overcome this problem, a method of using multiple heater stages and a wider heating area is described in JP2016-88821A.

SUMMARY OF THE INVENTION

Problems to be Solved by the Invention

When heaters are arranged in multiple stages, as in the method described in JP 2016-88821A, there may be low-temperature regions between heaters, resulting in areas of insufficient dehydration. When the porous glass base material for optical fiber with such a spot is vitrified, the transmission loss at 1383 nm, which is the OH absorption wavelength, increases in a part of the longitudinal direction of the manufactured glass base material for optical fiber.

The purpose of the present invention is to provide a sintering method of porous glass base material for optical fiber that enables dehydration to be sufficiently carried out as a whole, even if low temperature regions exist between heaters.

Means for Solving the Problems

A sintering method of porous glass base material for optical fiber according to the present invention uses a sintering apparatus comprising: a furnace core tube containing a porous glass base material for optical fiber whose longitudinal direction is along the axial direction; and a multi-stage heater in which two or more heaters, each of which can control the temperature independently of each other, surround the furnace core tube and are arranged in the axial direction of the furnace core tube to form a heating area in the furnace core tube. The sintering method comprises a first sintering step in which a porous glass base material for optical fiber is heated in the heating area to perform a first dehydration process; and a second sintering step in which the porous glass base material for optical fiber after the first dehydration process is moved so that the position in the longitudinal direction of the porous glass base material for optical fiber where the dehydration was identified as the most insufficient by a predetermined method, is at the position in the axial direction of the furnace core tube where the temperature is highest in the heating area, and then a second dehydration process in which the porous glass base material for optical fiber after the first dehydration process is further heated is performed.

By adopting this method, even if insufficient dehydration occurs in a part of the longitudinal direction of the porous glass base material for optical fiber due to the existence of a low-temperature region between heaters in the first dehydration process, further dehydration is performed in the second dehydration process for the insufficiently dehydrated part, so that dehydration can be sufficiently performed as a whole.

The second dehydration process may be carried out for more than two hours, for example.

This allows for more reliable dehydration.

In the first dehydration process, the porous glass base material for optical fiber may be heated while repeatedly reciprocated in the axial direction of the furnace core tube.

By heating, while repeatedly reciprocated in this manner in the first dehydration process, the number and extent of regions where dehydration is insufficient can be reduced, at least compared to the case where heating is performed in a stationary state.

In the second dehydration process, the porous glass base material for optical fiber, which has been moved after the first dehydration process, may be further heated while repeatedly reciprocated in the axial direction of the furnace core tube around the position after it has been moved.

By heating, while repeatedly reciprocated in this manner in the second dehydration process, the portion that was in the low-temperature region can be heated uniformly at the highest temperature in the heating area by the multi-stage heater. As a result, sufficient dehydration can be achieved more reliably as a whole.

The predetermined method of identifying the position where the dehydration is most insufficient for the porous glass base material for optical fiber after the first dehydration treatment may include, for example, performing the first dehydration process on another porous glass base material for optical fiber manufactured in the same way as the porous glass base material for optical fiber, and then measuring the distribution of the predetermined optical properties in the longitudinal direction for the glass base material for optical fiber produced by heating and sintering at a temperature higher than the heating temperature in the first dehydration process, and identifying the position based on the measurement result.

The glass base material for optical fiber after sintering shrinks with respect to the porous glass base material for optical fiber before sintering, but the relative positional relationship in the longitudinal direction between the two is maintained. Therefore, the optical properties at each position in the longitudinal direction of the porous glass base material for optical fiber before sintering can be ascertained by ascertaining the optical properties at each position in the longitudinal direction of the glass base material for optical fiber after sintering.

DETAILED DESCRIPTION OF THE EMBODIMENTS

Figure 1:
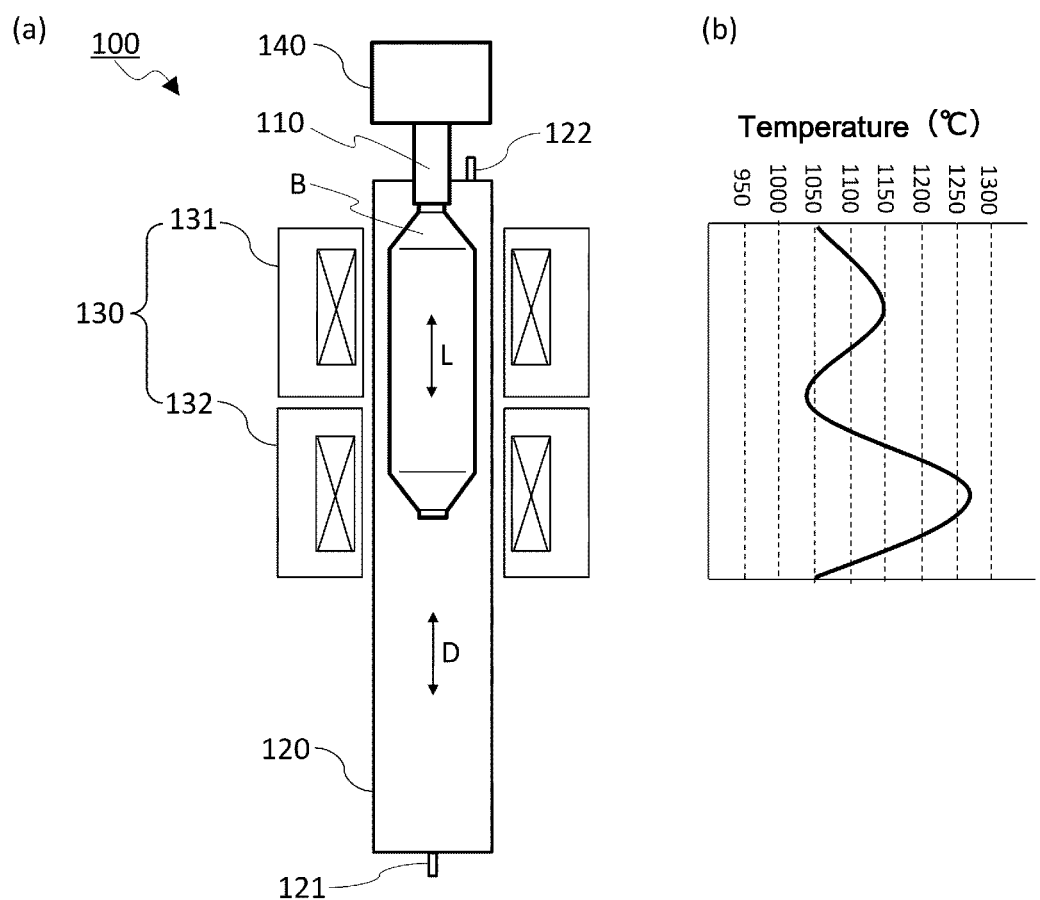
FIG. 1 shows a schematic cross-sectional view of the sintering apparatus for porous glass base material for optical fibers and the temperature distribution in the axial direction of the furnace core tube.

In the following, an embodiment of the present invention is described. Common components in each drawing are depicted with the same reference numeral.

(a) of FIG. 1 shows a schematic cross-sectional view of the sintering apparatus 100 for porous glass base material for optical fiber used to perform a sintering method of porous glass base material for optical fiber according to the present invention.

The sintering apparatus 100 for porous glass base material for optical fiber is an apparatus for dehydrating and sintering porous glass base material for optical fiber, and is equipped with a support rod 110, a furnace core tube 120, a multi-stage heater 130, and a lifting device 140.

The porous glass base material B for optical fiber to be sintered is manufactured beforehand by any method such as the VAD method, and has a core part formed at the center and a cladding part formed at the periphery thereof.

The support rod 110 supports the porous glass base material B for optical fiber at one end thereof.

The furnace core tube 120 contains the porous glass base material B for optical fiber supported by the support rod 110 so that its longitudinal direction L is along with the axial direction D of the furnace core tube 120. The furnace core tube 120 is a cylindrical core tube made of quartz glass, for example, and has an upper lid that can be opened and closed. The furnace core tube 120 is equipped with a gas supply port 121 at the bottom for supplying the gas necessary for dehydration and sintering into the furnace core tube 120, and a gas discharge port 122 at the top for discharging the gas in the furnace core tube 120 to the outside.

The multi-stage heater 130 has heaters 131 and 132 that can control the temperature independently of each other. The heaters 131 and 132 are provided around the furnace core tube 120, respectively, and are arranged in the axial direction D of the furnace core tube 120 to forma heating area in the furnace core tube 120. The example here shows a two-stage heater, but three or more stages are also acceptable.

The lifting device 140 grasps the other end of the support rod 110 and raises and lowers the porous glass base material B for optical fibers via the support rod 110, if necessary, along the axial direction D of the furnace core tube 120.

In the present invention, the porous glass base material B for optical fibers is dehydrated and sintered to produce a glass base material for optical fibers by sequentially performing the first dehydration process, the second dehydration process and the sintering process described below using the porous glass base material sintering apparatus 100 described above.

<First Dehydration Process>

In the first dehydration process, the other end of the support rod 110, which is connected to the porous glass base material B for optical fibers at one end, is connected to the lifting device 140. Then, the porous glass base material B for optical fiber in this state is inserted into the furnace core tube 120, and the upper lid is closed.

Next, the porous glass base material B for optical fiber is set at a predetermined position in the furnace core tube 120 by the lifting device 140, and the heaters 131 and 132 are raised so that the heating area for the porous glass base material B for optical fiber is in a predetermined temperature range. For example, a temperature range of 1000-1300° C. is suitable.

At this time, halogen gas or a mixture of halogen gas and inert gas is supplied into the furnace core tube 120 from the gas supply port 121. An appropriate amount of the supplied gas is discharged from the gas discharge port 122 so that the pressure in the furnace core tube 120 is maintained at a constant level. The volume concentration of the supplied halogen gas should is preferably 20-100%. For the dehydration process, $Cl_2$ or $SiCl_4$ is the preferred halogen gas, and He, Ar, or $N_2$ is the preferred inert gas.

When heating the porous glass base material B for optical fibers in the first dehydration process, heating may be performed while the porous glass base material B for optical fibers is reciprocated in the axial direction D of the furnace core tube 120 by the lifting device 140.

For the heating area formed in the core tube 120 shown in (a) of FIG. 1, (b) of FIG. 1 shows an example of the temperature distribution according to the position in the axial direction D. From (b) of FIG. 1, it can be seen that the temperature peaks near the center of each of the heaters constitute the multi-stage heater 130, while there are low-temperature regions between the heaters.

If the porous glass base material B for optical fiber is heated by keeping it stationary in the heating area with such a temperature distribution, not only does this result in insufficient dehydration in the portions located at the low-temperature regions, but in some cases, it results in insufficient dehydration in multiple locations or over a large area. However, by heating the porous glass base material B for optical fibers while repeatedly moving it back and forth in the axial direction D of the furnace core tube 120, the base material B is heated uniformly in the longitudinal direction L, and thus the number of locations where dehydration is insufficient and the size of areas where dehydration is insufficient can be reduced, at least compared to the case of heating in a stationary state.

The moving width of the reciprocating movement and the number of reciprocating movements or the reciprocating time may be set appropriately so that the straight body of the porous glass base material B for optical fibers is uniformly heated in the heating area.

<Second Dehydration Process>

In the second dehydration process, the porous glass base material B for optical fiber after the first dehydration process is moved so that the position in the longitudinal direction of the porous glass base material B for optical fiber where the dehydration was identified as the most insufficient by a predetermined method, is at the position in the axial direction of the furnace core tube where the temperature is highest in the heating area. And then, a second dehydration process in which the porous glass base material for optical fiber after the first dehydration process is further heated is performed.

Figure 2:
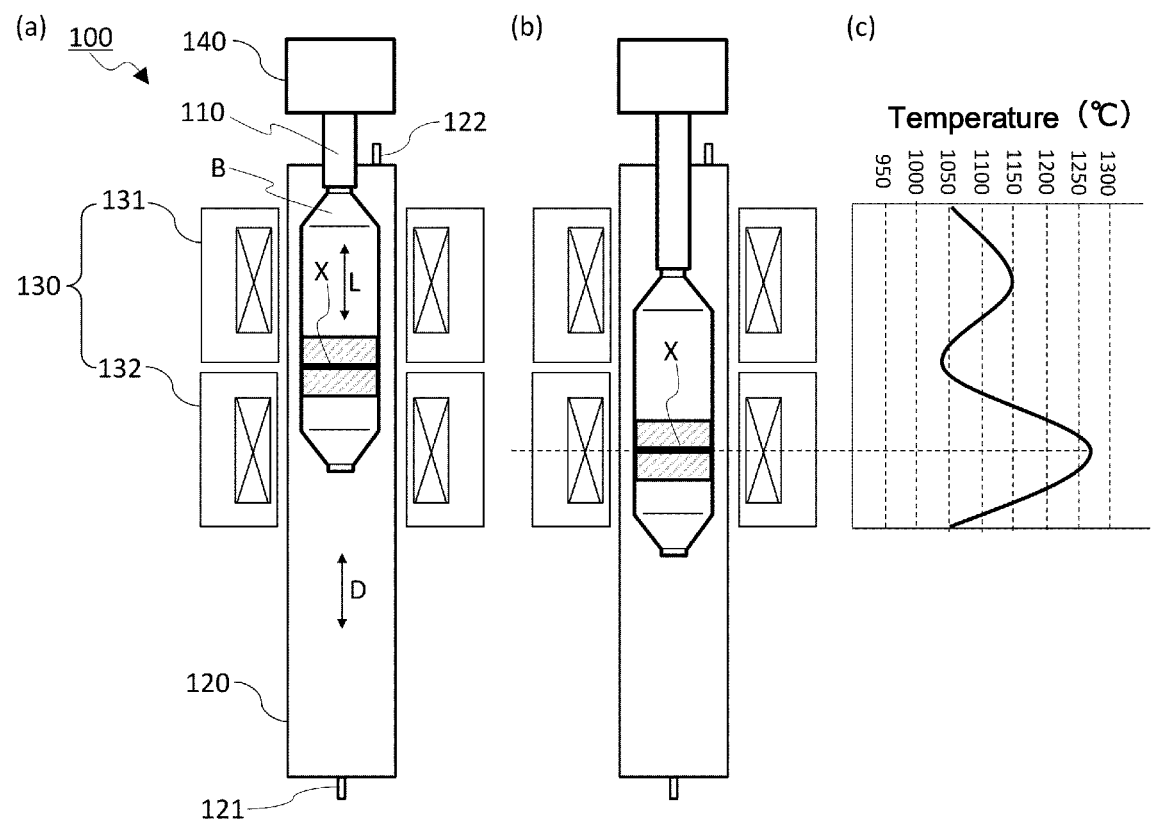
FIG. 2 illustrates how to move the porous glass base material for optical fibers in the second dehydration process.

For example, suppose that position X with the most insufficient dehydration in the longitudinal direction L of the porous glass base material B for optical fiber after the first dehydration treatment is identified as the position indicated by the bold line in (a) of FIG. 2. If the temperature distribution according to the position in the axial direction D of the heating area formed in the furnace core tube 120 shown in (a) of FIG. 2 is in the state shown in (c) of FIG. 2, the porous glass base material B for optical fiber after the first dehydration treatment is moved so that the position X with the most insufficient dehydration comes to the position indicated by the dotted line, which is the position of the highest temperature of the heating area in the furnace core tube 120.

The predetermined method of identifying the position where the dehydration is most insufficient for the porous glass base material B for optical fiber after the first dehydration treatment may include, for example, performing the first dehydration process on another porous glass base material for optical fiber manufactured in the same way as the porous glass base material B for optical fiber, and then measuring the distribution of the predetermined optical properties in the longitudinal direction for the glass base material for optical fiber produced by heating and sintering at a temperature higher than the heating temperature in the first dehydration process, and identifying the position based on the measurement result.

The optical properties of the glass base material for optical fibers used to identify the most insufficiently dehydrated position X in the porous glass base material for optical fibers B after the first dehydration process include, for example, the refractive index distribution in the longitudinal direction of the cladding portion and infrared absorption.

The glass base material for optical fiber after sintering shrinks with respect to the porous glass base material for optical fiber before sintering, but the relative positional relationship in the longitudinal direction between the two is maintained. Therefore, the optical properties at each position in the longitudinal direction of the porous glass base material for optical fiber before sintering can be ascertained by ascertaining the optical properties at each position in the longitudinal direction of the glass base material for optical fiber after sintering. For example, the refractive index of the cladding portion becomes higher at the locations where dehydration is insufficient due to the residual chlorine derived from the dehydration processing gas. Therefore, by ascertaining the refractive index distribution in the longitudinal direction of the cladding portion of the glass base material for optical fiber after sintering, it is possible to identify the locations where dehydration is most insufficient in the porous glass base material for optical fiber before sintering. In addition, since infrared absorption increases at positions with insufficient dehydration and high OH concentration, the position with the most insufficient dehydration can also be identified by ascertaining the infrared absorption in the longitudinal direction.

Figure 3:
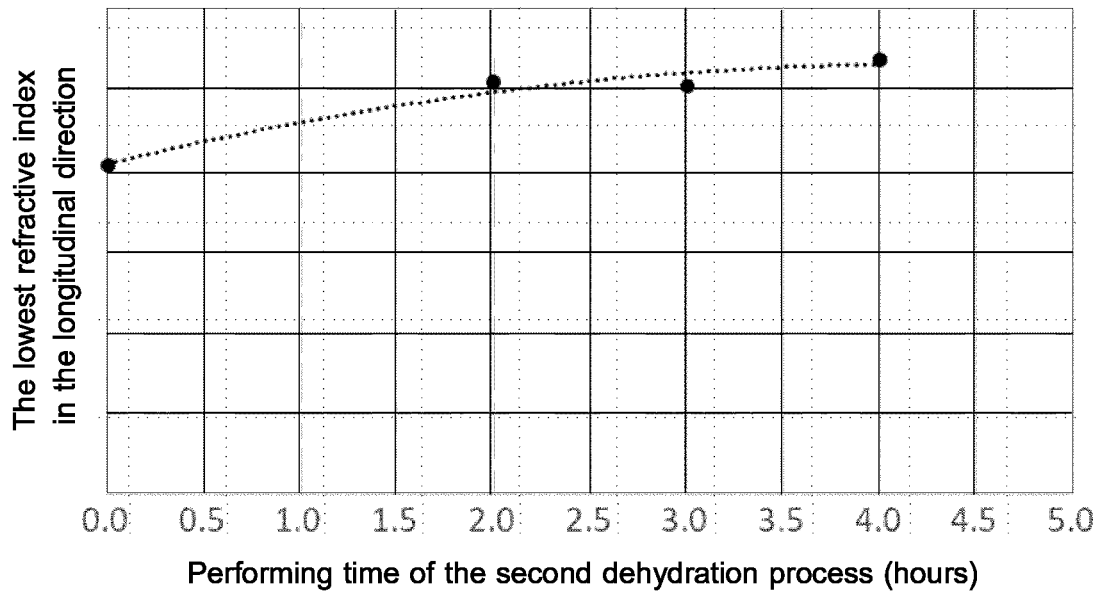
FIG. 3 shows the relationship between the performing time of the second dehydration process and the lowest refractive index in the longitudinal direction of the porous glass base material for optical fiber.

FIG. 3 shows the relationship between the performing time of the second dehydration process and the lowest refractive index in the longitudinal direction. As can be seen from FIG. 3, when the time is shorter than 2 hours, the lowest refractive index increases as time goes by, which means that the lack of dehydration is gradually being resolved, while after 2 hours, the refractive index is almost constant, which means that the state of sufficient dehydration has been reached. Therefore, it is preferable that the second dehydration process is performed for at least two hours.

By performing the second dehydration process in addition to the first dehydration process, even if some parts of the porous glass base material for optical fibers in the longitudinal direction are insufficiently dehydrated due to the existence of low-temperature regions between heaters in the first dehydration process, the parts that are insufficiently dehydrated are further dehydrated in the second dehydration process, thus enabling sufficient dehydration as a whole.

In the second dehydration process, the porous glass base material B for optical fiber, which has been moved after the first dehydration process, may be further heated while repeatedly reciprocated in the axial direction of the furnace core tube around the position after it has been moved.

As mentioned above, if the porous glass base material B for optical fiber is heated by keeping it stationary in the heating area with such a temperature distribution shown in (b) of FIG. 1 in the first dehydration process, not only does this result in insufficient dehydration in the portions located at the low-temperature regions, but in some cases, it results in insufficient dehydration in multiple locations or over a large area. However, by heating the porous glass base material B for optical fiber while repeatedly reciprocated in the axial direction D of the furnace core tube 120 around the position in the axial direction D of the core tube 120 where the temperature is the highest in the heating area, to which the base material is moved after the first dehydration process, the highest temperature in the heating area by the multi-stage heater 130 can be used to uniformly heat the part that was in the low-temperature region so that sufficient dehydration can be performed more reliably as a whole.

The moving range of the reciprocating movement may be, for example, based on the measurement result of the distribution of optical properties in the longitudinal direction L of the glass base material for optical fiber performed to identify the position X where the dehydration is most insufficient, identify the position range in the longitudinal direction L where the dehydration is insufficient above a certain level, and use the identified position range as the moving range. For example, if the identified position range is the shaded area shown in (a) of FIG. 2, the porous glass base material B for optical fiber is moved as shown in (b) of FIG. 2 and then reciprocated so that this shaded area repeatedly passes through the position indicated by the dotted line, which is the position of the highest temperature of the heating area in the furnace core tube 120.

<Sintering Process>

After the second dehydration process, the heater 132 is further heated to forma high-temperature heating area that is hotter than the heating area in the first and second dehydration processes. For example, a heating temperature of 1000-1300° C. is suitable. Then, the porous glass base material for optical fiber after the second dehydration treatment is lowered and passed through the high-temperature heating area to sinter the porous glass base material sequentially from the bottom to produce the glass base material for optical fiber.

According to the sintering method of porous glass base material for optical fiber described above, dehydration can be sufficiently performed as a whole even if there is a low-temperature region between heaters.

EXAMPLES

Examples supporting the effect of the invention are described below, along with a comparative example.

Comparative Example

Figure 4:
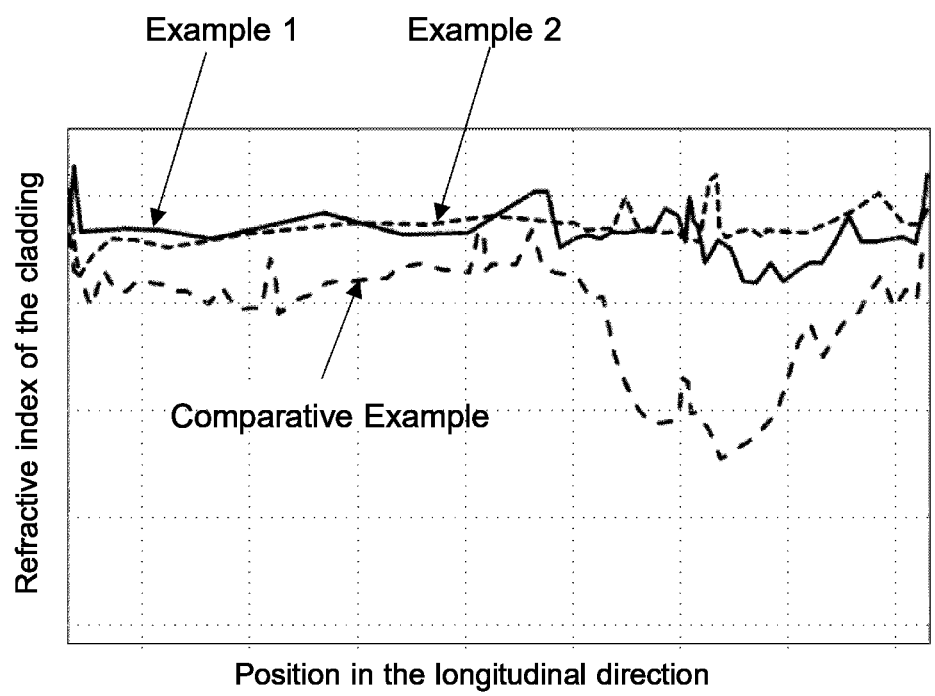
FIG. 4 shows the refractive index distribution in the longitudinal direction of the glass base material for optical fibers in each of the Comparative Example, Example 1 and Example 2.

After the first dehydration process was performed on the porous glass base material for optical fiber, the sintering process was performed to produce the glass base material for optical fiber. In FIG. 4, the refractive index distribution in the longitudinal direction of the glass base material for optical fiber produced in this way with long is shown by a long dashed line. This refractive index distribution shows that there is a region in the longitudinal direction where the refractive index is greatly depressed due to insufficient dewatering.

Example 1

For the porous glass base material for optical fiber after the first dehydration process under the same conditions as in the comparative example, the position identified as the most insufficiently dehydrated based on the refractive index distribution measured in the longitudinal direction of the cladding portion of the glass base material for optical fiber produced by the comparative example was moved to the position with the highest temperature in the heating area of the multi-stage heater. Then, the second dehydration process, in which the porous glass base material for optical fiber was heated while remaining at that position, was conducted for two hours. Then, the porous glass base material for optical fiber after the second dehydration process was further subjected to a sintering process to produce the glass base material for optical fiber. In FIG. 4, the refractive index distribution in the longitudinal direction of the glass base material for optical fiber produced in this way with long is shown by a solid line. This refractive index distribution shows that the base material is sufficiently dehydrated in the entire area, without any large drop in refractive index caused by insufficient dehydration.

Example 2

For the porous glass base material for optical fiber after the first dehydration process under the same conditions as in the comparative example, the position identified as the most insufficiently dehydrated based on the refractive index distribution measured in the longitudinal direction of the cladding portion of the glass base material for optical fiber produced by the comparative example was moved to the position with the highest temperature in the heating area of the multi-stage heater. Then, the upper-end position of the reciprocating movement of the porous glass base material for optical fiber was determined to be the position where the lower-end position of the region with insufficient dehydration above a certain level coincided with the position of the highest temperature of the heating area. The lower-end position of the reciprocating movement was determined to be the position where the upper-end position of the region with insufficient dehydration above a certain level coincided with the position of the highest temperature of the heating area. The second dehydration process, in which the porous glass base material was heated while repeatedly reciprocated in this manner, was performed for two hours. Then, the porous glass base material for optical fiber after the second dehydration process was further subjected to a sintering process to produce the glass base material for optical fiber. In FIG. 4, the refractive index distribution in the longitudinal direction of the glass base material for optical fiber produced in this way with long is shown by a short dashed line. This refractive index distribution shows that the base material is sufficiently dehydrated in the entire area, without any large drop in refractive index caused by insufficient dehydration.

The present invention is not limited to the above embodiments and examples, but any changes that have substantially the same configuration as the technical ideas described in the claims of the present invention and that produce similar effects are included in the technical scope of the present invention.

What is claimed is:

1. A sintering method of porous glass base material for optical fiber, using a sintering apparatus comprising:
   a furnace core tube containing the porous glass base material whose longitudinal direction is along an axial direction of the furnace core tube; and
   a multi-stage heater in which two or more heaters, each of which can control the temperature independently of each other, surround the furnace core tube and are arranged in the axial direction of the furnace core tube to form a heating area in the furnace core tube,
   wherein the sintering method includes:
   heating the porous glass base material in the heating area to perform a first dehydration process; and
   after the first dehydration process, moving the porous glass base material to position the porous glass base material in the longitudinal direction such that a location in the porous glass base material where dehydration was identified as being most insufficient by a predetermined method is at a position in the axial direction of the furnace core tube where the temperature is highest in the heating area, and then further heating the porous glass base material in a second dehydration process,
   wherein, in the further heating of the second dehydration process, the porous glass base material is repeatedly reciprocated in the axial direction of the furnace core tube around the location in the porous glass base material where dehydration was identified as being most insufficient by the predetermined method, and
   after the first and second dehydration processes, heating and sintering the porous glass base material at a temperature higher than a temperature at which the second dehydration process is performed.

2. The sintering method of porous glass base material for optical fiber according to claim 1, wherein the second dehydration process is performed for 2 hours or more.

3. The sintering method of porous glass base material for optical fiber according to claim 1, wherein in the first dehydration process, the porous glass base material is heated while repeatedly reciprocated in the axial direction of the furnace core tube.

4. The sintering method of porous glass base material for optical fiber according to claim 1, wherein the predetermined method of identifying the location where the dehydration is most insufficient for the porous glass base material after the first dehydration treatment is determined by performing the first dehydration process on another porous glass base material for optical fiber manufactured in the same way as the porous glass base material, and then measuring a distribution of predetermined optical properties in a longitudinal direction for the another glass base material produced by heating and sintering at a temperature higher than a heating temperature in the first dehydration process, and identifying the location based on the measurement result.

* * * * *